United States Patent [19]

Tronel

[11] Patent Number: 5,681,048
[45] Date of Patent: Oct. 28, 1997

[54] FLAT ELASTOMERIC/METALLIC GASKET

[75] Inventor: Tanguy Tronel, Lyons, France

[73] Assignee: Curty Payen S.A., Saint Priest, France

[21] Appl. No.: 524,521

[22] Filed: Sep. 7, 1995

[30] Foreign Application Priority Data

Sep. 13, 1994 [FR] France .................. 94 11110

[51] Int. Cl.$^6$ ...................................... F16J 15/12
[52] U.S. Cl. ...................... 277/235 B; 277/235 R; 277/180
[58] Field of Search .................. 277/235 B, 180, 277/235 R

[56] References Cited

U.S. PATENT DOCUMENTS

| | | | |
|---|---|---|---|
| 2,170,363 | 3/1939 | Balfe | 277/235 B |
| 3,352,564 | 11/1967 | Johnson | 277/180 |
| 3,560,007 | 2/1971 | Ascencio | 277/235 B |
| 3,794,333 | 2/1974 | Czernik et al. | 277/180 |
| 4,743,421 | 5/1988 | McDowell et al. | 264/129 |
| 4,852,893 | 8/1989 | Wesley | 277/1 |
| 5,310,197 | 5/1994 | Bruch et al. | 277/235 B |

FOREIGN PATENT DOCUMENTS

| | | |
|---|---|---|
| 0 557 918 A1 | 1/1993 | European Pat. Off. . |
| 3242526 | 11/1982 | Germany .................. 277/235 B |
| 279 994 | 4/1952 | Switzerland . |

*Primary Examiner*—Willam A. Cuchlinski, Jr.
*Assistant Examiner*—Christina Annick
*Attorney, Agent, or Firm*—Herbert Dubno; Andrew Wilford

[57] ABSTRACT

A flat sealing gasket has a metallic core plate lying generally in a plane, having a pair of opposite faces, and formed with at least one throughgoing hole and unitarily formed offset from the hole with an array of rigid abutments projecting beyond the faces. A bead of elastomeric material is provided on each of the faces around the hole and a layer of filler material is integrally joined to the bead and embedding the abutments. A grooved metallic ring surrounds the hole.

5 Claims, 2 Drawing Sheets

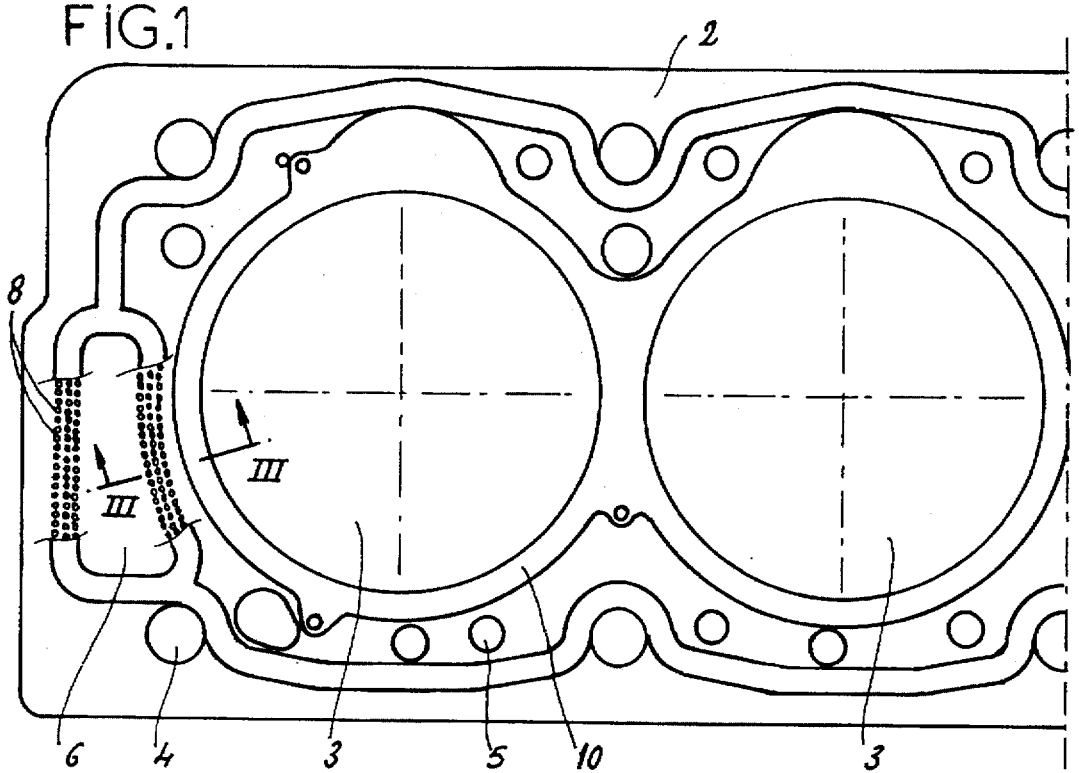
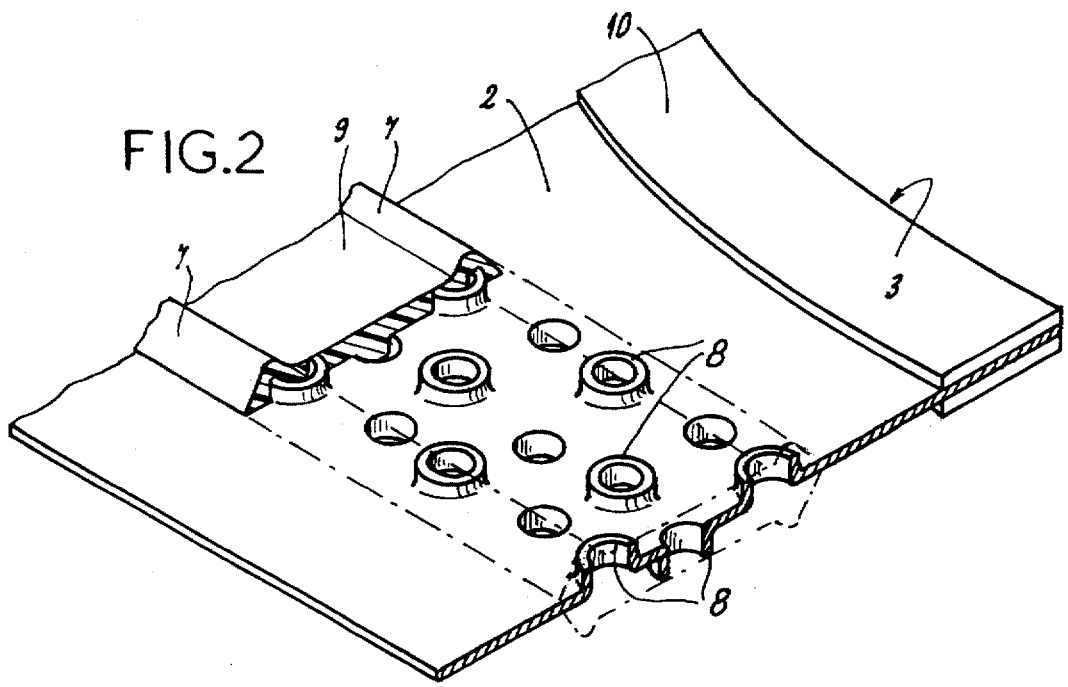

FLAT ELASTOMERIC/METALLIC GASKET

FIELD OF THE INVENTION

The present invention relates to a gasket. More particularly this invention concerns a flat elastomeric/metallic gasket used in an internal combustion engine.

BACKGROUND OF THE INVENTION

Such a gasket is used in an engine to seal between the block and the cylinder head around each combustion chamber and around the coolant and lubricant passages near these chambers. The engine gasket thus has different holes for the combustion chambers, lubricant passages, coolant passages, and mounting studs.

There are several types of head gaskets. The most well known types are fiber gaskets and metallic gaskets. The fiber gaskets have a metallic core and covering of fibers such as asbestos. In view of the development of laws in most countries, the use of asbestos is increasingly regulated so that this type of gasket is disappearing.

As far as the metallic gaskets, there are multilayer ones and elastomeric/metallic ones. The former are generally formed by a central plate that defines the thickness of the gasket and two grooved plates sandwiching the central plate to form a seal both around the combustion chambers (fire rings) as well as around the coolant and lubricant passages. The two grooved plates are intended to be in contact with the engine block and with the cylinder head. The grooves are elastic so as to be able to locally and progressively compress the gasket and also to ensure good sealing. Nonetheless, these grooves are not capable of accommodating the irregularities of the engine block and of the cylinder head in the plane of the gasket. In order to achieve this microsealing, a thin elastomeric layer (about 25 µm thick) is provided on the grooved plates to make a perfect seal.

These metallic multilayer gaskets are used only with an engine block and cylinder head having a good surface for receiving the gasket since the thin elastomeric layer can only accommodate slight irregularities. In addition the manufacture of these gaskets is done with unproven methods and they are still quite expensive.

The elastomeric/metallic gaskets themselves are formed by a central metallic plate, grooved metallic fire rings, elastomeric beads molded on the central plate around the coolant and lubricant passages and clamping abutments. In such gaskets the clamping pressures are localized where sealing is necessary, at the fire rings and elastomeric beads. Nonetheless a difference in rigidity between the metallic fire rings and the elastomeric beads necessitates the presence of the clamping abutments that are intended to limit the compression of the elastomer and flexing of the cylinder head.

These elastomeric/metallic head gaskets allow one to seal well with respect to fluids and gas. Thanks to the flexibility of the elastomer and the presence of the abutments, the elastomeric beads are not loaded very much and there is good clamping at the fire rings. All this allows minimal clamping because it is concentrated at the fire rings so that structure is not excessively stressed.

The abutments are generally formed by a metallic strip welded or riveted around the entire outer edge of the central plate. This metal strip is cut out of a planar metal sheet having generally the same dimensions as the central plate. The amount of metal wasted is significant, since the entire punched-out center of the plate is unusable. The cost of the gasket is thus relatively high since three pieces of sheet metal of the size of the gasket are needed to form one single gasket.

The known elastomeric/metallic gaskets also have problems with respect to the bond of the elastomeric core to the core of the gasket. This bead can detach itself, thereby causing a complete loss of sealing capacity.

OBJECTS OF THE INVENTION

It is therefore an object of the present invention to provide an improved head gasket.

Another object is the provision of such an improved head gasket which overcomes the above-given disadvantages, that is which seals well while ensuring good springback and microsealing with abutments that do not increase the cost of the gasket.

A further object is to provide an improved head gasket where the abutments are extremely rigid, having virtually no elasticity.

SUMMARY OF THE INVENTION

An elastomeric/metallic gasket, in particular a flat seal, has as is standard a core formed with at least one hole allowing a fluid to pass and formed by at least one plate, at least one elastomeric bead, and clamping abutments. According to the invention at least one clamping abutment is a rigid abutment formed by a boss that is may be open and that formed in a plate forming the core of the gasket and imbedded in a layer of filler material attached to the elastomeric bead.

In this manner the core of the gasket cooperates with the layer of filler material to ensure the function of the abutment that serves to limit the compression of the elastomer and to prevent flexing of the cylinder head. In addition the fact that one filler material covers a boss ensures an excellent hold of this material on the core of the gasket because this boss forms an anchor point and since the elastomeric bead is attached to the filler material this bead also holds better on the core compared to a bead formed on a smooth surface in the prior art. Finally this configuration is easy to manufacture. In effect few steps are needed to simultaneously form the abutments and the sealing bead since the core of the gasket is to start with stamped out, then the elastomeric bead and the layer of filler are molded on it.

In order to intimately bond the filler layer and the elastomeric bead these are advantageously formed by the same material. This makes it possible to use a single molding operation.

At the same time to ensure an excellent seal and to also for example get good thermal insulation, the elastomeric bead and the filler layer are formed of two different materials, one serving as filler for the abutments and the other forming the seal bead. The filler material can serve as thermal insulation while increasing the rigidity of the bosses and the bead can serve for sealing. The use of two different materials allows one to optimize the structure and to best perform each function.

The core of the gasket can be formed by one or two plates. In the former case the rigid abutments advantageously project on the two faces of this plate while in the second case each plate only has rigid abutments projecting on its face turned away from the other plate. Of course the two plates are stacked. It is possible to stack more than two plates in which case only the outside plates have rigid abutments on their outer faces, but this increases the cost of the gasket without improving it.

The rigid abutments are preferably open bosses. In this case the abutments are each formed as a circular collar having a wall generally perpendicular to a plane of the core of the gasket. This same shape allows one to make abutments with no elasticity.

The clamping abutments are advantageously formed by perforation of the core of the gasket.

BRIEF DESCRIPTION OF THE DRAWING

The above and other objects, features, and advantages will become more readily apparent from the following description, reference being made to the accompanying drawing in which:

FIG. 1 is a top view of a head gasket according to the invention;

FIG. 2 is a perspective view of a detail of the gasket of FIG. 1;

SPECIFIC DESCRIPTION

Figure 3:
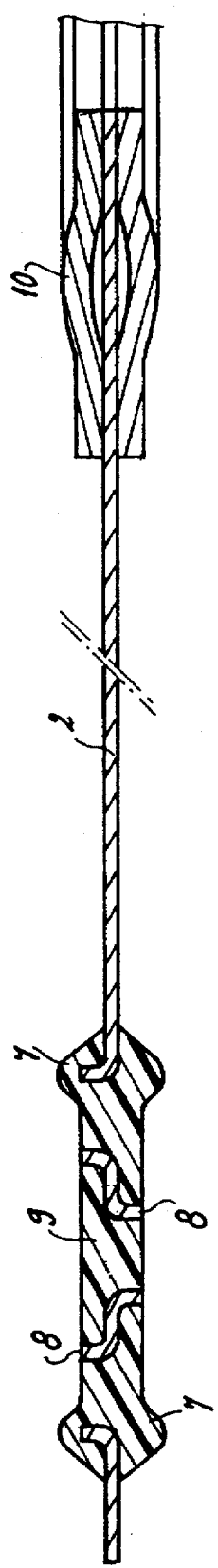
FIG. 3 is a large-scale section taken along line III—III of FIG. 1.

As seen in FIGS. 1 through 3 a head gasket according to the invention has a steel core 2 of generally rectangular shape and having two central holes 3 corresponding to combustion chambers. The gasket has around these central holes 3 a certain number of holes 4 intended for accommodating centering or mounting bolts, holes 5 intended for the passage of motor-cooling liquid, and holes 6 intended for the passage of lubricating liquid.

The seal around the central holes 3 is formed as is standard by fire rings formed by metallic edgings 10 crimped on the edges of these holes 3.

Molded elastomeric beads 7 seal around the holes 5 and 6 for coolant and lubricant, respectively.

In the embodiment shown in FIGS. 1 to 3 the core 2 of the gasket is formed by a single plate 2 formed of sheet steel. In addition to the holes 3, 4, 5, and 6 described above the plate 2 has rigid abutments 8 formed as cylindrical collars whose walls are generally perpendicular to the plane of the gasket. They can be formed for example by stamping or perforation.

The height of these abutments 8 is established as a function of the compression needed by the elastomeric beads 7 to ensure a good seal. In FIGS. 1 to 3 these abutments 8 are imbedded in a layer 9 of elastomeric material that is intimately bonded to the beads 7 to interconnect them. In this case the abutments 8 are placed as close as possible to the beads 7 that seal. The beads 7 are higher than the layer 9 and the height of the abutments 8 corresponds generally to the height of the layer 9.

The elastomeric layer 9 serving to fill the space between the abutments 8 is made of the same material as the beads 7 but it does not serve for sealing purposes. When this elastomer is confined it becomes rigid and increases the rigidity of the abutments 8. In addition the elastomer of the layer 9 serving as filler material and the elastomer serving as seal bead are molded at the same time and form an intimately integrated assembly. The hold of this elastomer mass on the plate 2 is excellent thanks to the abutments 8.

Figure 4:
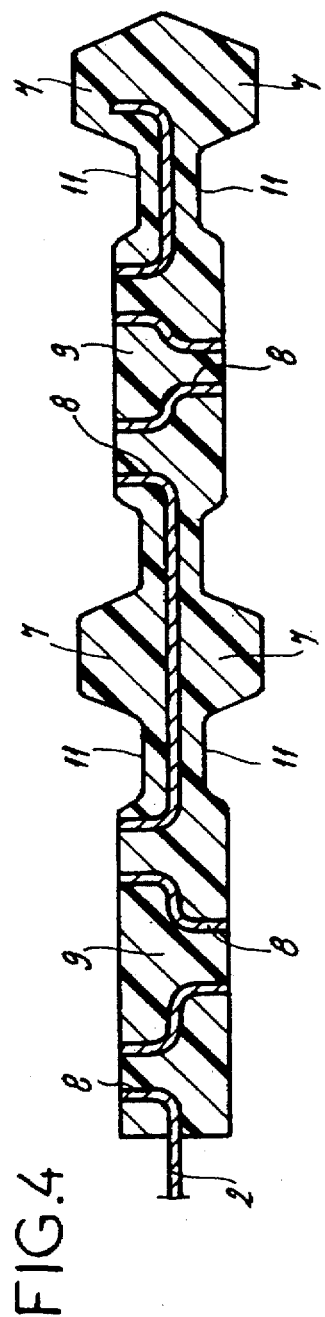
FIG. 4 is a view like FIG. 3 of another gasket according to the invention.

FIG. 4 shows another embodiment of a head gasket according to the invention. This embodiment shows how a part of the elastomer serves for sealing while another part serves as filler material adding to the rigidity of the abutments 8.

In this embodiment there is a plate 2, chimney-shaped abutments 8, two elastomeric beads 7, and two filler layers 9. Between the filler layers 9 and the seal beads 7 there are grooves 11. When the elastomeric beads 7 are compressed these grooves 11 allow better deformation of the beads 7 and thus favor a better seal.

In this embodiment it is perfectly possible to use two different materials to form the beads 7 and the layers 9. The layers 9 can thus be made of plastic.

The abutments 8 of the two described head gaskets allow the formation of a perfect seal for fluids (recapture and microsealing) while ensuring that the compression of the bead 7 is limited while only using a single metallic plate 2. They do not themselves serve for sealing but allow the bead 7 to do this itself while preventing the unillustrated head from flexing thanks to their distribution over the core of the gasket. Finally these abutments 8 are as rigid as possible, in particular thanks to the presence of the confined filler material while they have virtually no elasticity.

The assembly formed by the sealing beads, the filler layer, and the abutments of the core of the gasket is compact and homogenous and allows one to avoid all problems of delamination of the bead as occurs often with the standard molded parts of the prior art.

The abutments imbedded in the filler material protect the sealing beads. They also have insulating properties with respect to the transmission of heat, unlike the metallic clamping abutments of the prior art described in the introduction, and they also damp mechanical vibrations.

When the materials filling the abutments and forming the sealing beads are identical it is possible in a single molding operation to fill the abutments and form the sealing beads.

It is to be understood that the invention is not limited to the embodiments shown in the drawing and described above by way of nonlimiting examples; instead it includes all variants.

Thus for example the rigid abutments can be formed by a simple bump that is not open. Other forms of bumps are also possible, for example an oblong shape.

Figure 5:
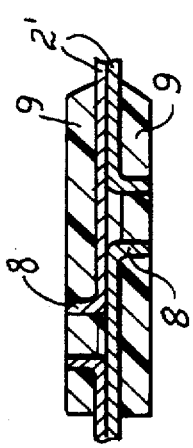
FIG. 5 is a detail view of an alternative arrangement according to the invention.

Instead of only one plate, the core of the gasket can be formed of two plates 2' one atop the other as shown in FIG. 5. Each of these plates 2' thus will have abutments 8 that will project away from the other plate 2'.

Finally, no matter how the abutments are shaped, certain of them can not be embedded in the filler layer. It is possible on the same gasket to have rigid abutments embedded in a filler layer and other non embedded ones that are next to an elastomeric bead or even at the edge of the core of the gasket.

I claim:

1. An elastomeric/metallic head gasket comprising:
   a metallic core plate lying generally in a plane, having a pair of opposite faces, formed with at least one throughgoing combustion hole and at least one throughgoing liquid-passage hole, and unitarily formed offset from the holes with an array of rigid abutments projecting and extending mainly perpendicular from the faces;
   a respective bead of elastomeric material on each of the faces around the liquid-passage hole, offset parallel to the plane from the abutments, and projecting transversely from the faces past the abutments; and
   respective layers of filler material bonded to the faces, integrally joined to the beads, and imbedding the abutments.

2. The elastomeric/metallic gasket defined in claim 1, further comprising a grooved metallic ring surrounding the combustion hole.

3. The elastomeric/metallic gasket according to claim 1 wherein the core of the gasket is formed by a single plate and the rigid abutments project on the two faces of this plate.

4. An elastomeric/metallic head gasket comprising:

a metallic core lying generally in a plane, having a pair of opposite faces, formed with at least one throughgoing combustion hole and at least one throughgoing liquid-passage hole, and unitarily formed offset from the holes with an array of rigid abutments projecting and extending mainly perpendicular from the faces, the core of the gasket being formed by two plates placed one atop the other and each plate only having rigid abutments projecting on its face turned away from the other plate;

a respective bead of elastomeric material on each of the faces around the liquid-passage hole; and respective layers of filler material bonded to the faces, integrally joined to the beads, and imbedding the abutments.

5. An elastomeric/metallic head gasket comprising:

a metallic core lying generally in a plane, having a pair of opposite faces, formed with at least one throughgoing combustion hole and at least one throughgoing liquid-passage hole, and unitarily formed offset from the holes with an array of rigid abutments projecting and extending mainly perpendicular from the faces, at least one of the rigid abutments being formed as a circular collar having a wall generally perpendicular to a plane of the core of the gasket;

a respective bead of elastomeric material on each of the faces around the liquid-passage hole; and respective layers of filler material bonded to the faces, integrally joined to the beads, and imbedding the abutments.

* * * * *